United States Patent
Hwang et al.

(10) Patent No.: US 7,386,035 B2
(45) Date of Patent: Jun. 10, 2008

(54) METHOD OF COMPENSATING FOR ENERGY LOSS AND ELIMINATING INTER-SYMBOL INTERFERENCE AND INTER-CHIP INTERFERENCE AND RAKE RECEIVER FOR WLAN ADOPTING THE SAME

(75) Inventors: Sung-hyun Hwang, Suwon-si (KR); Hyun-cheol Park, Daejon (KR); Yu-sung Lee, Daejon (KR)

(73) Assignees: Samsung Electronics Co. Ltd. (KR); Research and Industrial Cooperation Group (KR)

( * ) Notice: Subject to any disclaimer, the term of this patent is extended or adjusted under 35 U.S.C. 154(b) by 623 days.

(21) Appl. No.: 10/981,428

(22) Filed: Nov. 4, 2004

(65) Prior Publication Data

US 2005/0094715 A1 May 5, 2005

(30) Foreign Application Priority Data

Nov. 5, 2003 (KR) ...................... 10-2003-0078105

(51) Int. Cl.
*H04B 1/00* (2006.01)
(52) U.S. Cl. .................. 375/148; 375/136; 375/142; 375/143; 375/144; 375/145; 375/149; 375/150; 375/151; 375/152; 375/153; 375/233; 375/343; 375/346
(58) Field of Classification Search ................ 375/136, 375/142–145, 148–153, 229–236, 346–350, 375/343
See application file for complete search history.

(56) References Cited

U.S. PATENT DOCUMENTS

| 5,623,511 | A  | * | 4/1997  | Bar-David et al. ........... 375/143 |
| 6,233,273 | B1 |   | 5/2001  | Webster et al. ............. 375/148 |
| 6,256,508 | B1 |   | 7/2001  | Nakagawa et al. .......... 455/503 |
| 2002/0159422 | A1 |   | 10/2002 | Li et al. .................... 370/342 |
| 2004/0091019 | A1 | * | 5/2004  | Chen et al. .................. 375/144 |
| 2004/0131109 | A1 | * | 7/2004  | Kim et al. ................... 375/148 |

FOREIGN PATENT DOCUMENTS

| JP | 2001-257628 | 9/2001 |
| KR | 10-0254515 | 2/2000 |
| KR | 01-15100 | 2/2001 |
| KR | 01-45061 | 6/2001 |

* cited by examiner

*Primary Examiner*—Curtis B. Odom
(74) *Attorney, Agent, or Firm*—Mills & Onello LLP

(57) ABSTRACT

Provided is a method of compensating for energy loss and eliminating inter-symbol interference (ISI) and inter-chip interference (ISI) in wireless signals, and a rake receiver for wireless LANs adopting the same. The rake receiver compensates for energy loss of a CCK signal transmitted in a multi-path wireless channel environment and eliminates ISI and ICI from the received CCK signal because a DFE structure per chip used for calculating ICI components, is connected in parallel with a DFE structure per symbol, thus eliminating ISI and ICI components.

18 Claims, 9 Drawing Sheets

US 7,386,035 B2

METHOD OF COMPENSATING FOR ENERGY LOSS AND ELIMINATING INTER-SYMBOL INTERFERENCE AND INTER-CHIP INTERFERENCE AND RAKE RECEIVER FOR WLAN ADOPTING THE SAME

BACKGROUND OF THE INVENTION

This application claims the priority of Korean Patent Application No. 2003-78105, filed on Nov. 5, 2003, in the Korean Intellectual Property Office, the contents of which are incorporated herein in their entirety by reference.

1. Field of the Invention

The present invention relates to a local area network (hereinafter referred to as "LAN"), and more particularly, to a method of compensating for energy loss and eliminating inter-symbol interference and inter-chip interference, and a rake receiver for a wireless LAN adopting the method.

2. Description of the Related Art

Wireless local area networks (WLANs) defined in IEEE 802.11.B/G standard wirelessly connect private or public LANs to offer ease of information transmission to users who utilize such devices as computers and mobile communications terminals. The IEEE 802.11.B/G standard also defines complementary code keying (CCK) signals.

Generally, CCK signals are transmitted in the 2.4 GHz band at a maximum transmission speed of 11 Mbps. When signals are transmitted through wireless channel environments, the transmitted signals experience multi-path fading. The multi-path fading causes interference between the signals, which, in turn, causes transmission errors, thereby degrading system performance. Therefore, a rake receiver or equalization techniques must be used to compensate for the distortion of and interference between the signals generated through multiple paths, and energy loss.

General transmission techniques of WLAN signals such as CCK signals are disclosed in U.S. Pat. No. 6,256,508 and U.S. Patent Publication No. 2002/0159422. In the IEEE802.11.B/G standard, a CCK symbol transmitted using a quadrature phase shift keying (QPSK) modulation is composed of eight chips. A plurality of the CCK symbols constitute a CCK symbol stream and each of the CCK symbols may be composed of a different number of chips.

When a CCK symbol transmitted using the QPSK modulation is composed of 8 chips, CCK code indicating the CCK symbol may be expressed as in Equation 1. In Equation 1, C denotes an eight chip code, and a value of each of the chips is one of four values in Equation 3 according to Equations 1 and 2. In this regard, CCK signals transmitted through multiple paths experience inter symbol interference (ISI) and inter chip interference or intra-codeword chip interference (ICI).

$$C = \{c_0, c_2, c_2, c_3, c_4, c_5, c_6, c_7\} \quad \text{Equation 1}$$
$$= \{e^{j(\varphi_1+\varphi_2+\varphi_3+\varphi_4)}, e^{j(\varphi_1+\varphi_3+\varphi_4)}, e^{j(\varphi_1+\varphi_2+\varphi_4)},$$
$$e^{-j(\varphi_1+\varphi_4)}, e^{j(\varphi_1+\varphi_2+\varphi_3)}, e^{j(\varphi_1+\varphi_3)}, e^{-j(\varphi_1+\varphi_2)}, e^{j(\varphi_1)}\}$$

$$\Phi_n \in \{0, \pi/2, \pi, -\pi/2\}, (n=1,2,3,4) \quad \text{Equation 2}$$

$$c_k \in \{1, j, -1, -j\}, (k=0,1,2,\ldots,7) \quad \text{Equation 3}$$

FIG. 1 illustrates an example of receiving transmitted signals delayed by reflectors. Referring to FIG. 1, signals transmitted from a transmitter 10 are reflected by reflectors 12 and 13. Unlike signals not reflected by the reflectors 12 and 13, the reflected signals are delayed by a predetermined period of time ($T_1$ or $T_2$) before being received by a receiver 11.

FIG. 2 illustrates ISI and ICI components of CCK symbols received through a multi-path channel as shown in FIG. 1. For example, using a second CCK codeword 20-2 as a reference, symbols 21 of the delayed signals belong to a first CCK codeword 20-1, but are received when the second CCK code word 20-2 of the signal that is not delayed is received, thereby causing ISI. Symbols 22 of the delayed signals belong to the second CCK code word 20-2, thus causing ICI in the second symbol 20-2.

FIG. 3 is a block diagram of a conventional rake receiver. Referring to FIG. 3, the conventional rake receiver includes a channel matched filter 31, a CCK correlator 32, and a CCK codeword determination unit 33. Reference numeral 34 indicates a channel impulse response, and reference numeral 35 indicates an impulse response of an output from the channel matched filter 31. The conventional rake receiver of FIG. 3 compensates for energy loss in the channel matched filter 31. However, it is not possible to eliminate ISI and ICI caused by a precursor 35-1 and a post cursor 35-2 of the output of the channel matched filter 31.

FIG. 4 is a block diagram of another conventional rake receiver having a decision feedback equalizer (DFE) structure for eliminating ISI. Referring to FIG. 4, the conventional rake receiver includes a channel matched filter 31, a CCK correlator 32, a CCK codeword determination unit 33, and an ISI detector 41. The ISI detector 41 detects an ISI component of a previous symbol using a CCK code obtained from the CCK codeword determination unit 33. Then, the detected ISI component is eliminated from an output signal of the channel matched filter 31. The rake receiver of FIG. 4 may eliminate an ISI component that affects a present symbol by using a demodulated CCK code. However, the rake receiver cannot eliminate ICI, that is, an interference component between chips.

SUMMARY OF THE INVENTION

The present invention provides a rake receiver for a wireless local area network (WLAN) compensating for energy loss of a complementary code keying (CCK) signal transmitted in a multi-path wireless channel environment and eliminating inter-symbol interference (ISI) and inter-chip interference (ICI) from the received CCK signal by connecting, in parallel, a decision feedback equalizer (DFE) structure per chip, which calculates ICI components, to a DFE structure per symbol, which eliminates ISI and ICI components.

The present invention also provides a method of compensating for energy loss of a CCK signal transmitted in a multi-path wireless channel environment and eliminating ISI and ICI from the received CCK signal.

According to an aspect of the present invention, there is provided a rake receiver for a WLAN including an ICI detector, a code determination unit, and an ISI detector. The ICI detector detects ICI information of a symbol based on first correlation values extracted from a received symbol stream and outputs the ICI information. The code determination unit extracts a peak of a symbol from second correlation values extracted from the received symbol stream and ISI information of a previous symbol and outputs code data corresponding to the peak. The ISI detector detects the ISI information of the previous symbol using the code data.

In one embodiment, the received symbol stream is composed of CCK symbols. In one embodiment, each of the CCK symbols is composed of eight bits. In one embodiment, the code data is eight-bit CCK data.

In one embodiment, the rake receiver further includes a channel matched filter, an equalizer, and a first correlator. The channel matched filter receives the received symbol stream, match filters the received symbol stream, and outputs a matched filtered signal. The equalizer receives the matched filtered signal, performs distortion compensation, and outputs a distortion compensated signal. The first correlator receives the distortion compensated signal, and calculates and outputs the first correlation values. The equalizer can include: a feed forward filter filtering the matched filtered signal and outputting a first finite impulse response filtered signal; a second subtracting unit subtracting a second finite impulse response filtered signal from the first finite impulse response filtered signal and outputting the distortion compensated signal; a chip determination unit determining a logic state of each bit value of the distortion compensated signal and outputting a digital signal based on the determined logic state value; and a feed back filter filtering the digital signal and outputting the second finite impulse response filtered signal. In one embodiment, each of the feed forward filter and the feed back filter delays an input signal by a predetermined sampling of time, generates delayed signals, multiplies each of the delayed signals by predetermined coefficients, adds the multiplied signals, and outputs the result.

In one embodiment, the rake receiver further includes a delay unit, a first subtracting unit, a second correlator, and an adding unit. The delay unit delays the matched filtered signal for a predetermined period of time and outputs a delayed signal. The first subtracting unit subtracts interference information from the delayed signal and outputs a subtracted signal. The second correlator receives the subtracted signal from the first subtracting unit, and calculates and outputs second correlation values. The adding unit adds the ICI information and the ISI information of the previous symbol and outputs the result as the interference information. In one embodiment, the predetermined period of time is a period of one symbol.

According to another aspect of the present invention, there is provided a method of compensating for energy loss and eliminating ISI and ICI including detecting ICI information of a symbol based on first correlation values extracted from a received symbol stream, extracting a peak of a symbol from second correlation values extracted from the received symbol stream and ISI information of a previous symbol and generating code data corresponding to the peak, and detecting the ISI information of the previous symbol using the code.

In one embodiment, the received symbol stream is composed of complementary code keying symbols. Each of the complementary code keying symbols is composed of eight chips. The code data is eight bit complementary code keying data In one embodiment, the method further includes match filtering of the received symbol stream, performing distortion compensation on the match filtered signal, and calculating the first correlation values from the distortion compensated signal.

In one embodiment, the distortion compensation comprises: filtering the matched filtered signal, thereby generating a first finite impulse response filtered signal; subtracting a second finite impulse response filtered signal from the first finite impulse response filtered signal, thereby generating the distortion compensated signal; determining a logic state of each bit value of the distortion compensated signal and generating a digital signal having the determined logic state-values; and filtering the digital signal, thereby generating a second finite impulse response filtered signal. In one embodiment, each of the first finite impulse response filtering and the second finite impulse response filtering comprises delaying an input signal by a predetermined sampling of time, generating delayed signals, multiplying each of the delayed signals by predetermined coefficients, and adding the multiplied signals.

In one embodiment, the method further includes delaying the matched filtered signal for a predetermined period of time, subtracting interference information from the delayed signal, calculating second correlation values based on the subtracted signal, and adding the inter-chip interference information and the ISI information of the previous symbol and the result as the interference information. In one embodiment, the predetermined period of time is a period of one symbol.

BRIEF DESCRIPTION OF THE DRAWINGS

The foregoing and other objects, features and advantages of the invention will be apparent from the more particular description of a preferred embodiment of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 5:
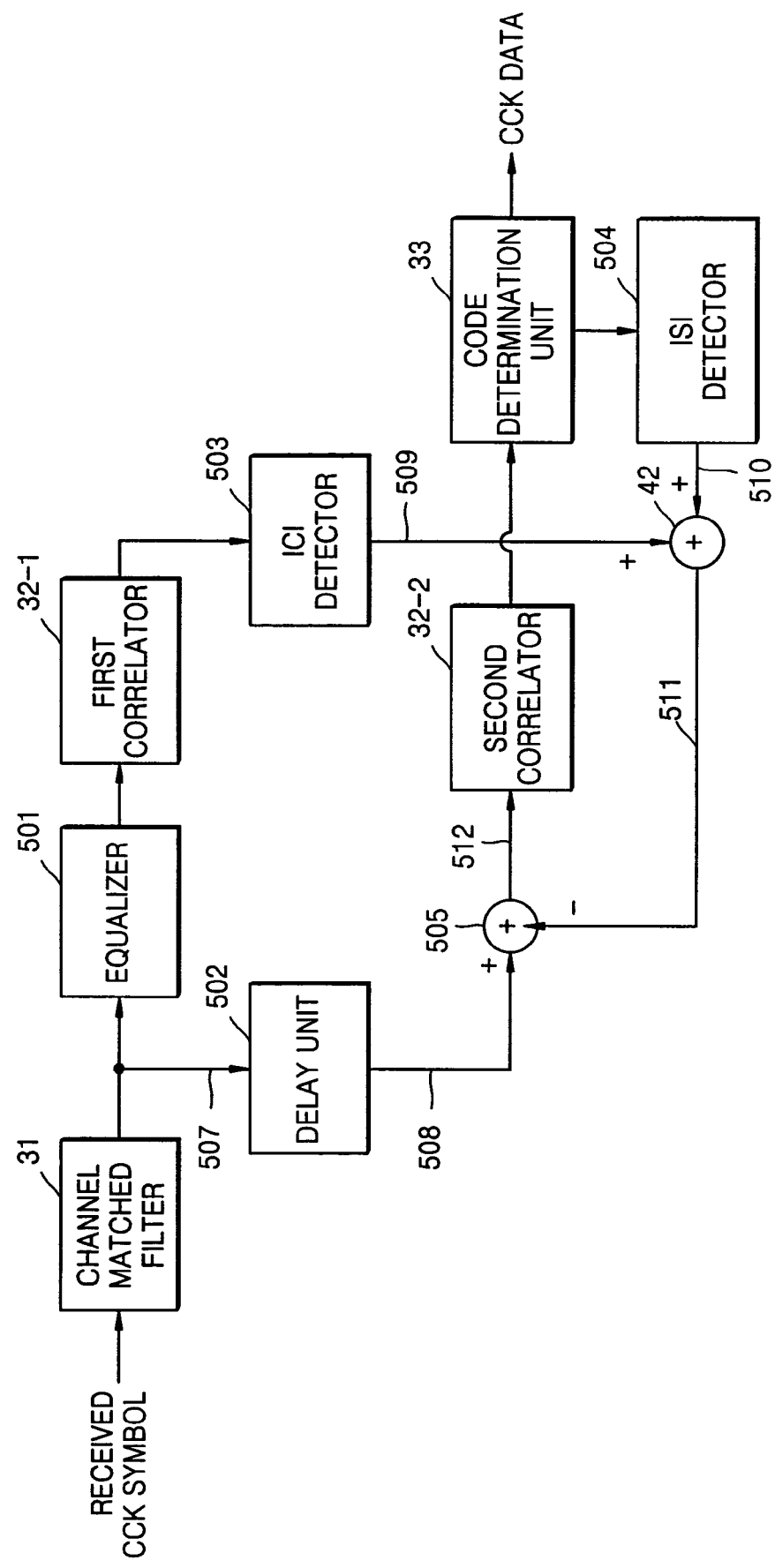
FIG. 5 is a block diagram of a rake receiver according to an embodiment of the present invention.

FIG. 5 is a block diagram of a rake receiver according to an embodiment of the present invention.

Referring to FIG. 5, the rake receiver includes a channel matched filter 31, an equalizer 501, a first correlator 32-1, an inter-chip interference (ICI) detector 503, a delay unit 502, a first subtracting unit 505, a second correlator 32-2, a code determination unit 33, an inter-symbol interference (ISI) detector 504, and an adding unit 42.

The channel matched filter 31 receives a symbol stream, performs matched filtering of the received symbol stream, and outputs a matched filtered signal 507. As a number of taps being used increases, performance of the channel matched filter 31 is improved. When using quadrature phase shift keying (QPSK) modulation, the received symbol stream may be composed of symbols, each composed of eight chips defined by complementary code keying (CCK) codes as shown in Equations 1 through 3. Equations 1 through 3 are exemplary equations for defining eight chips. Different chip values may be defined by using different equations.

Figure 1:
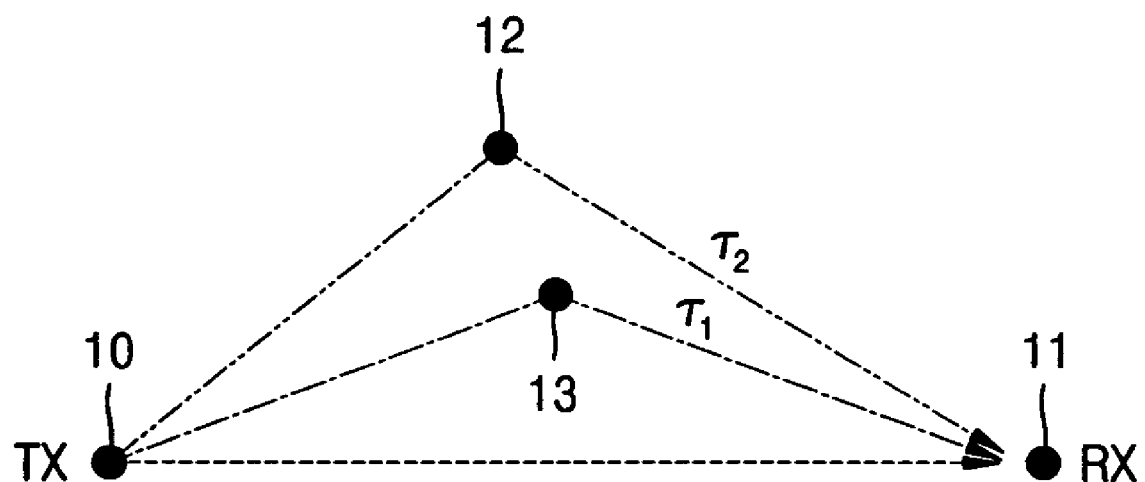
FIG. 1 illustrates an example of receiving transmitted signals delayed by. reflectors.
Figure 2:
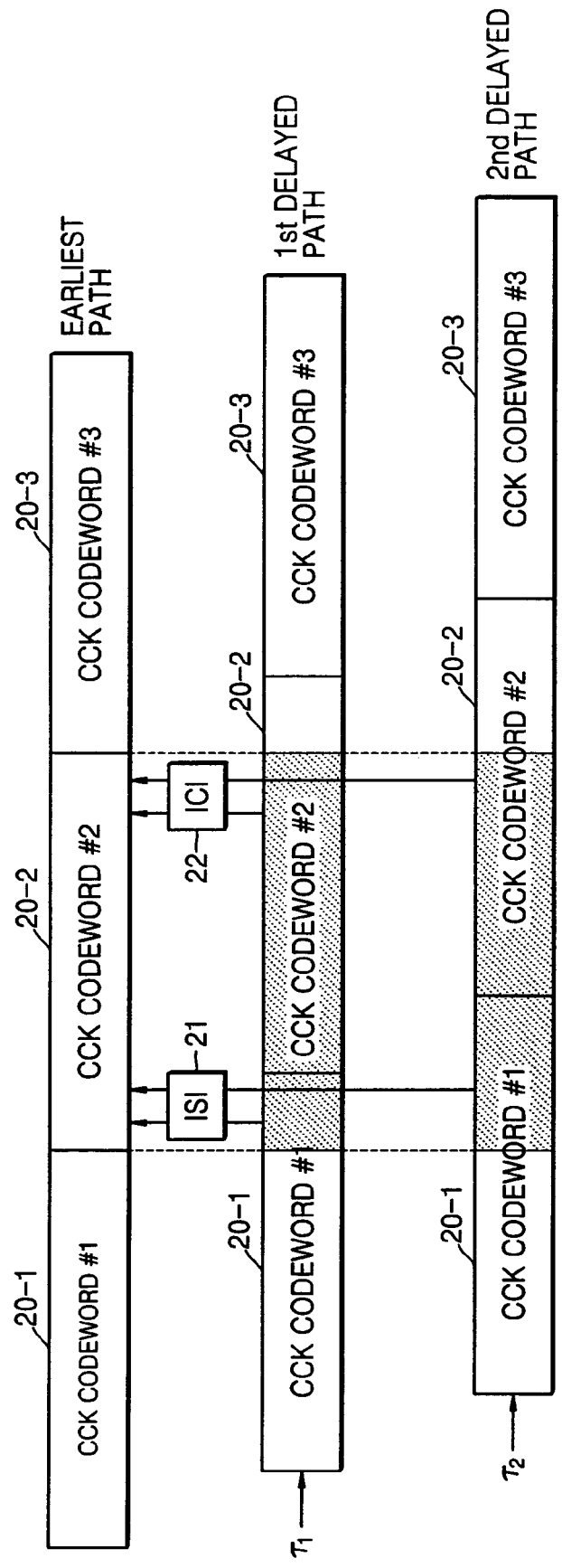
FIG. 2 illustrates inter-symbol interference (ISI) and inter-chip interference (ICI) components of CCK symbols received through a multi-path channel as shown in FIG. 1.
Figure 3:
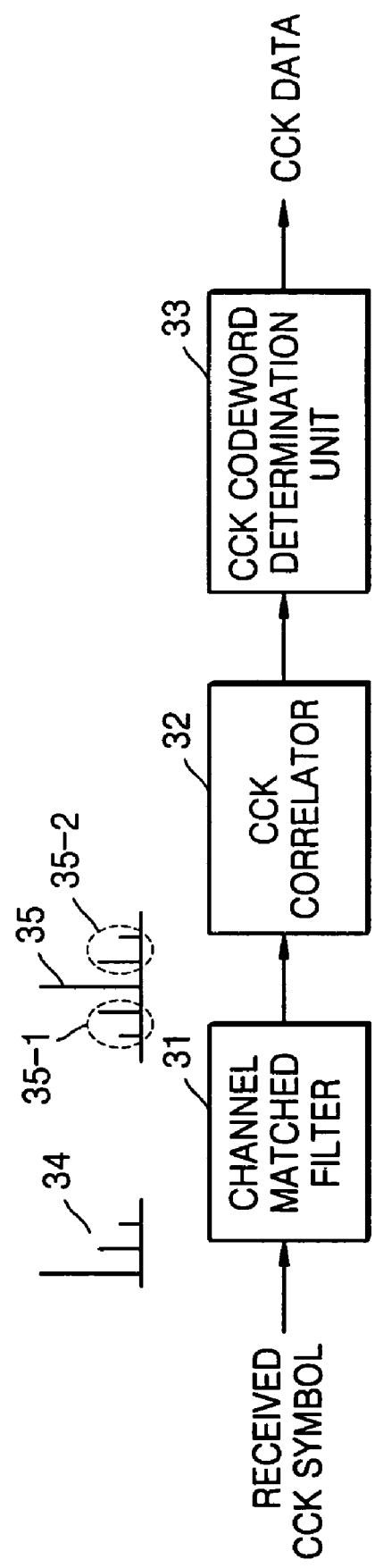
FIG. 3 is a block-diagram of a conventional rake receiver.

A CCK symbol of the received symbol stream may be composed of a different number of chips depending on a system. In addition to the QPSK scheme, other modulation schemes such as a binary phase shift keying (BPSK) scheme may be used as a CCK modulation scheme. A radio frequency (RF) module receives a wireless CCK signal in an allocated channel, detects a signal at baseband, converts an analog signal at baseband into a digital signal, and generates a CCK symbol stream. Referring to FIG. 3, the matched-filtering compensates for a loss of signal energy due to multi-path fading and improves channel impulse response characteristics of the received symbol stream.

The equalizer 501 receives the matched filtered signal 507, performs distortion compensation, and outputs a distortion compensated signal. The first correlator 32-1 receives the distortion compensated signal, performs auto-correlation, and calculates and outputs first correlation values. The ICI detector 503 detects and outputs ICI information 509 of a present symbol based on the first correlation values extracted from the received symbol stream.

The delay unit 502 delays the matched filtered signal 507 for a predetermined period of time, that is, for a period of one symbol to compensate for the time the matched filtered signal 507 is processed by the equalizer 501. Then, the delay unit 502 outputs a delayed signal 508. The first subtracting unit 505 subtracts interference information 511 from the delayed signal 508 and outputs a subtracted signal 512. The second correlator 32-2 receives the subtracted signal 512 from the first subtracting unit 505, performs auto-correlation, and calculates and outputs second correlation values.

The code determination unit 33 extracts a peak for each symbol based on the second correlation values extracted from the received symbol stream and ISI information 510 of a previous symbol. Then, the code determination unit 33 outputs CCK data corresponding to the peak. The CCK data is final demodulated data. As described above, if the received symbol stream is composed of symbols, each having eight chips, the CCK data may be 8-bit digital data. The demodulated CCK data is de-scrambled in a unit connected to the code determination unit 33 and transmitted to a user as useful LAN information.

The ISI detector 504 detects the ISI information 510 of the previous symbol using the CCK data. The adding unit 42 adds the ICI information 509 and the ISI information 510 of the previous symbol, and outputs the result as the interference information 511.

Figure 6:
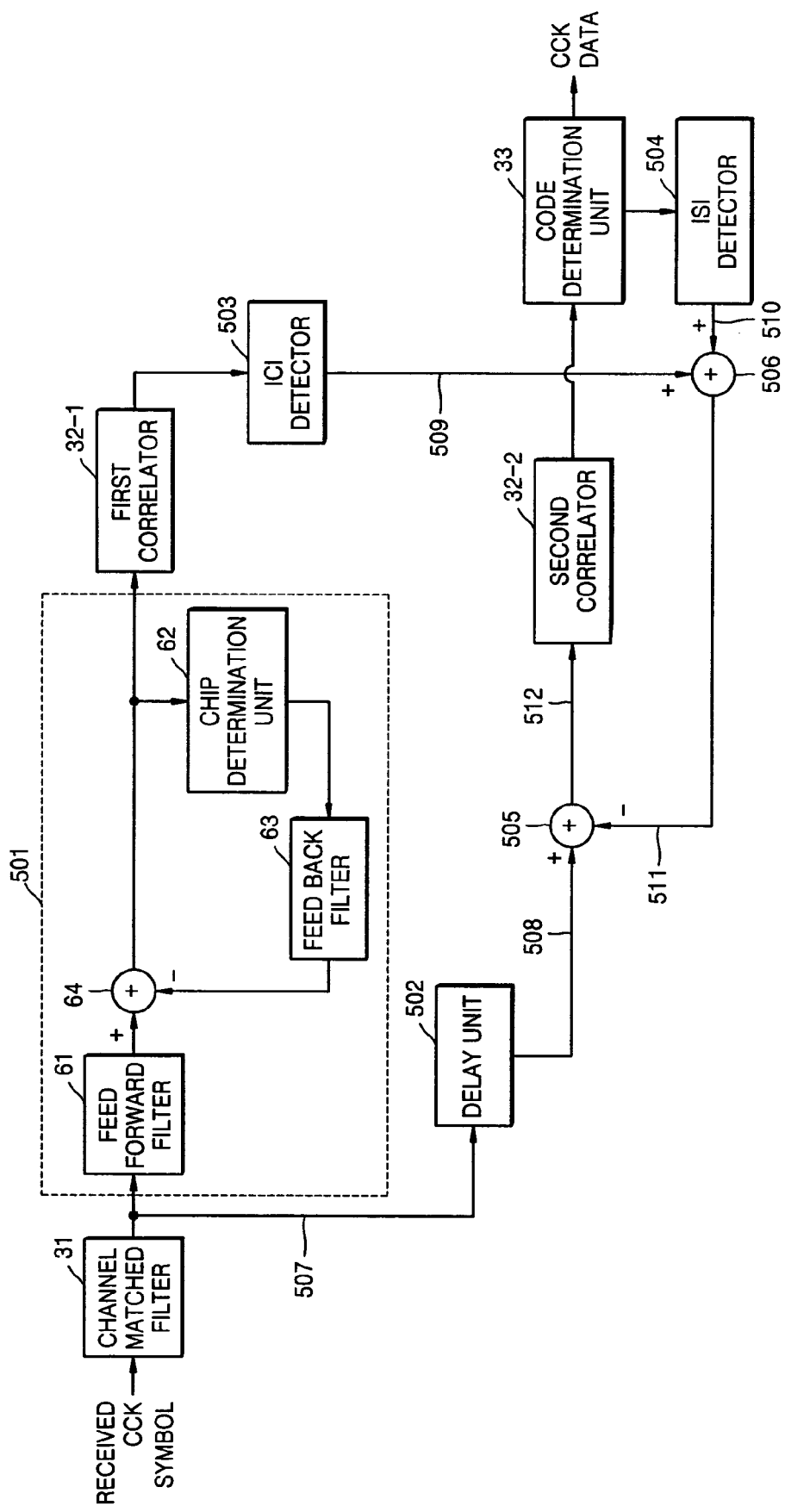
FIG. 6 is a block diagram of a rake receiver having a DFE structure used as an equalizer of FIG. 5.

FIG. 6 is a block diagram of a rake receiver having a decision feedback equalizer structure used as the equalizer 501 of FIG. 5.

Referring to FIG. 6, the equalizer 501 includes a feed forward filter 61, a second subtracting unit 64, a chip determination unit 62, and a feed back filter 63. The feed forward filter 61 performs first finite impulse response (FIR) filtering of the matched filtered signal 507 and outputs a first FIR filtered signal. The second subtracting unit 64 subtracts a second FIR filtered signal from the first FIR filtered signal and outputs the distortion compensated signal.

The chip determination unit 62 determines bit values of the distortion compensated signal, that is, a logic state of each chip, and outputs a digital signal based on the determined logic state value. Since the distortion compensated chip values contain noise, they are signals with inaccurate logic states. The chip determination unit 62 compares each of the distortion compensated chip values with a predetermined critical value, determes logic states of the chip values, and outputs a clean digital signal. The feed back filter 63 performs the second FIR filtering of the digital signal and outputs a second FIR filtered signal.

The first FIR filtering and the second FIR filtering compensate for the distortion of an input signal using a specific FIR filter. As well known, the FIR filter delays an input signal by a predetermined sampling of time and generates delayed signals. Then, the FIR filter multiplies each of the delayed signals by predetermined coefficients, adds the multiplied signals, and outputs the result.

Values of the coefficients by which the delayed signals are multiplied are different from one another. In addition, the values of the coefficients used in the first FIR filtering may be different from those of the coefficients used in the second FIR filtering. In the first FIR filtering, coefficient values for compensating for the initial portion of the channel impulse response, that is, a precursor component, are selected. In the second FIR filtering, coefficient values for compensating for the final portion of the channel impulse response, that is, a post cursor component, are selected. When a number of multipliers multiplying each of the delayed signals by coefficients or a number of coefficients is L, the FIR filter is called an L-tap filter. As the number of taps increases, the performance of the FIR filter is improved.

Figure 4:
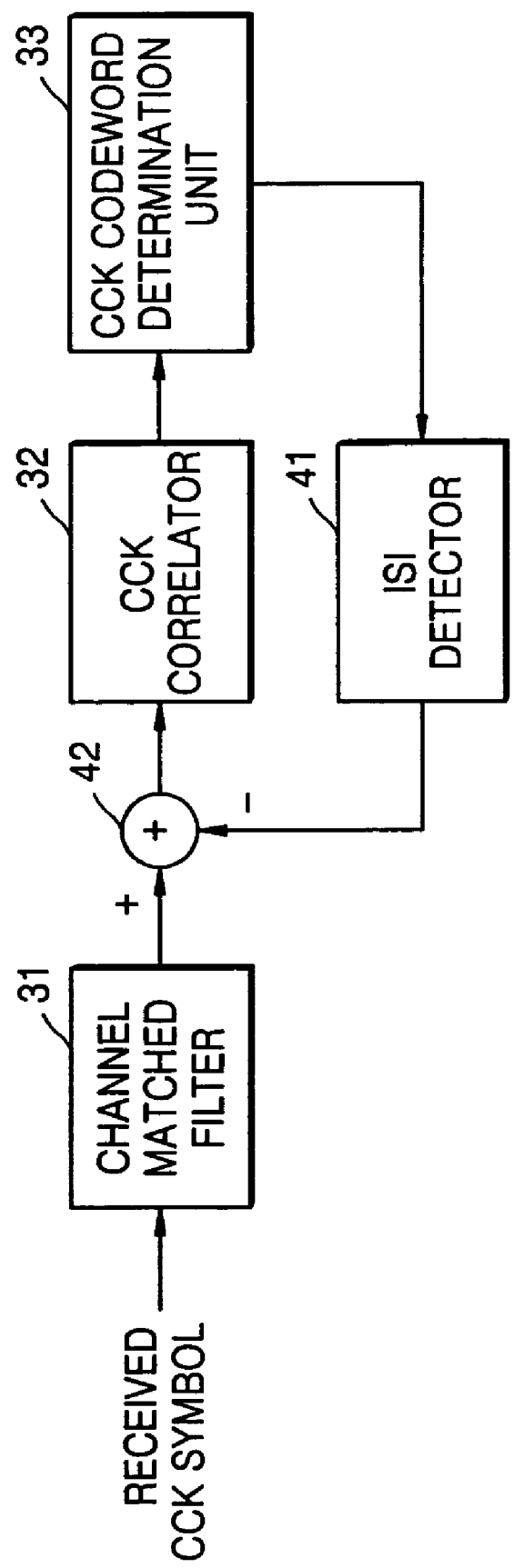
FIG. 4 is a block diagram of another conventional rake receiver having a decision feedback equalizer (DFE) structure for eliminating ISI.
Figure 7:
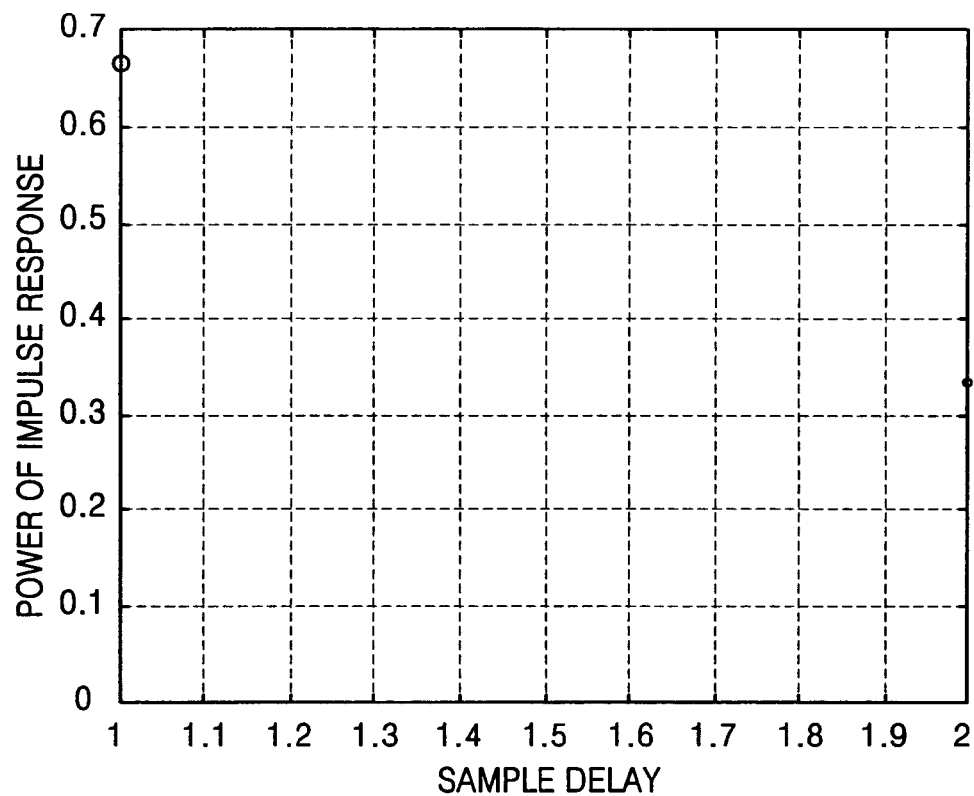
FIG. 7 is a graph illustrating a two-ray channel model used in simulations.
Figure 8:
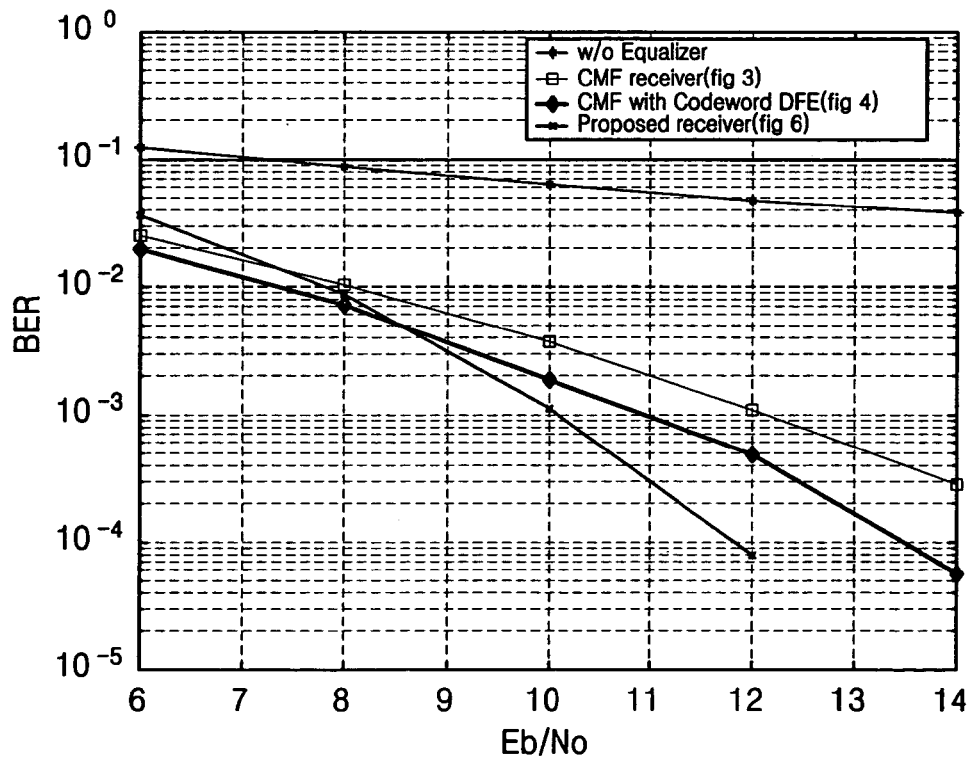
FIG. 8 is a graph illustrating results of performance simulations of the devices of FIGS. 3, 4, and 6 for the two-ray channel model illustrated by FIG. 7.

FIG. 7 is a graph illustrating a two-ray channel model used in simulations. FIG. 8 is a graph illustrating results of performance simulations of the devices of FIGS. 3, 4, and 6 for the two-ray channel model illustrated by FIG. 7. Simulations involved two taps of each of the channel matched filters 31, five taps of the feed forward filter 61, and four taps of the feed back filter 63. Referring to FIG. 8, as bit error/noise density (Eb/No) increased, the rake receiver according to an embodiment of the present invention shown in FIG. 6 showed a significantly improved bit error rate (BER) over the conventional rake receivers of FIGS. 3 and 4.

Figure 9:
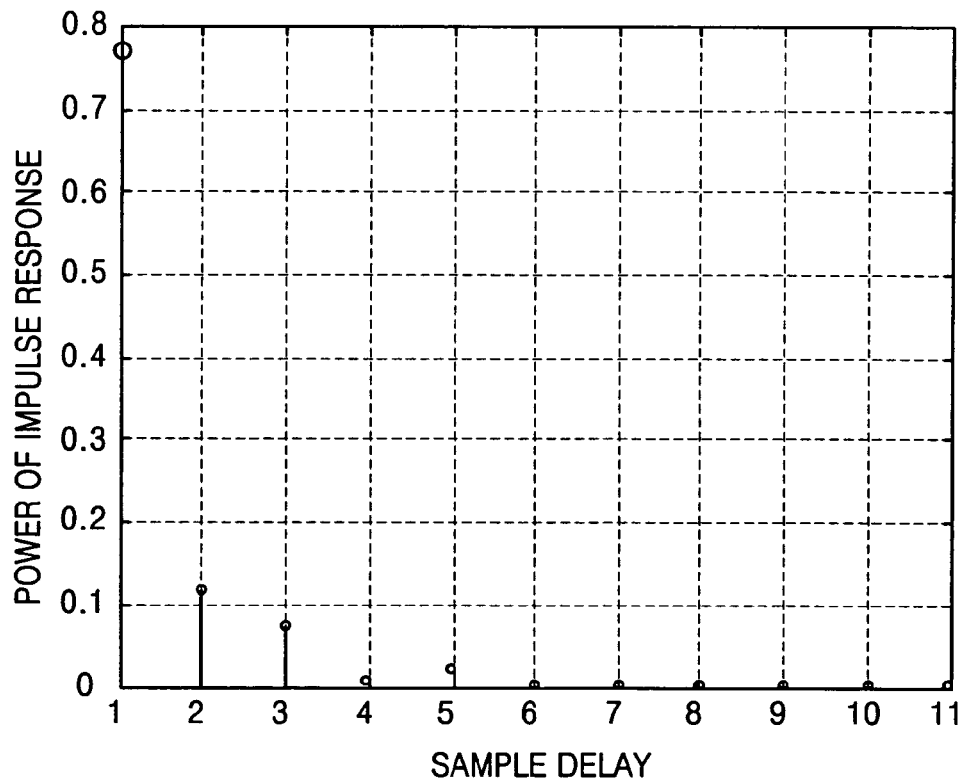
FIG. 9 is a graph illustrating an exponential functional channel model having a 90 nsec root mean square (RMS) delay spread used in simulations.
Figure 10:
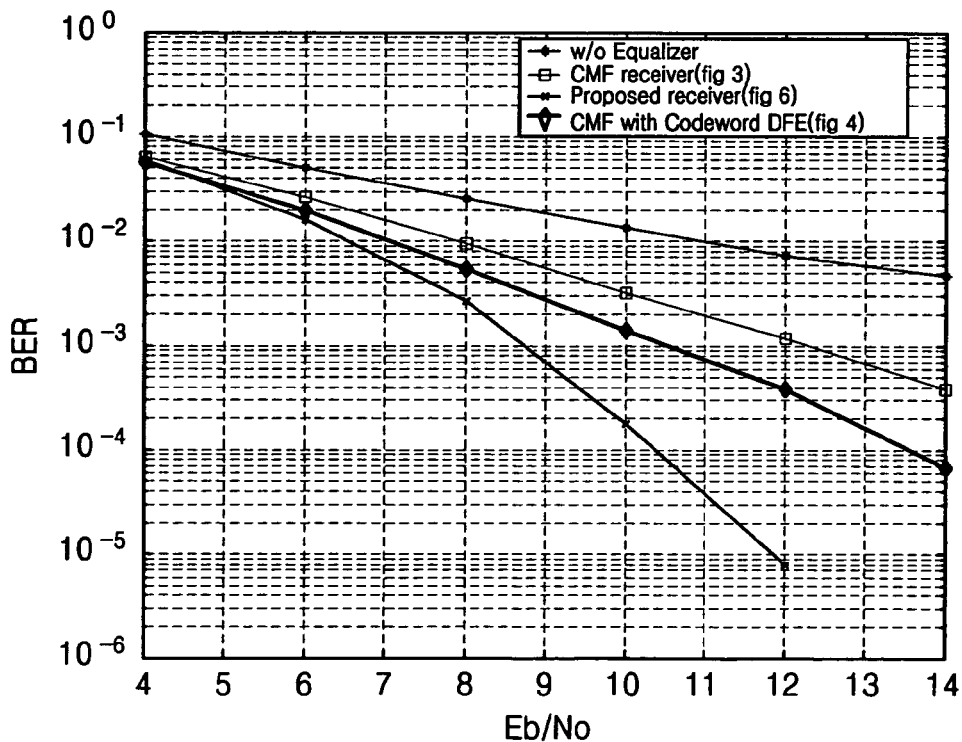
FIG. 10 is a graph illustrating results of performance simulations of the devices of FIGS. 3, 4, and 6 for the exponential functional channel model illustrated by FIG. 9.

FIG. 9 is a graph illustrating an exponential functional channel model having a 90 nsec root mean square (RMS) delay spread used in simulations. FIG. 10 is a graph illustrating results of performance simulations of the devices of FIGS. 3, 4, and 6 for the exponential functional channel model illustrated by FIG. 9.

Simulations involved an exponential functional 11-ray channel model including five taps of each of the channel matched filters 31, five taps of the feed forward filter 61, and four taps of the feed back filter 63. Referring to FIG. 10, as the Eb/No increased, the rake receiver according to an embodiment of the present invention illustrated by FIG. 6 showed a significantly superior BER over the conventional rake receivers of FIGS. 3 and 4.

Figure 11:
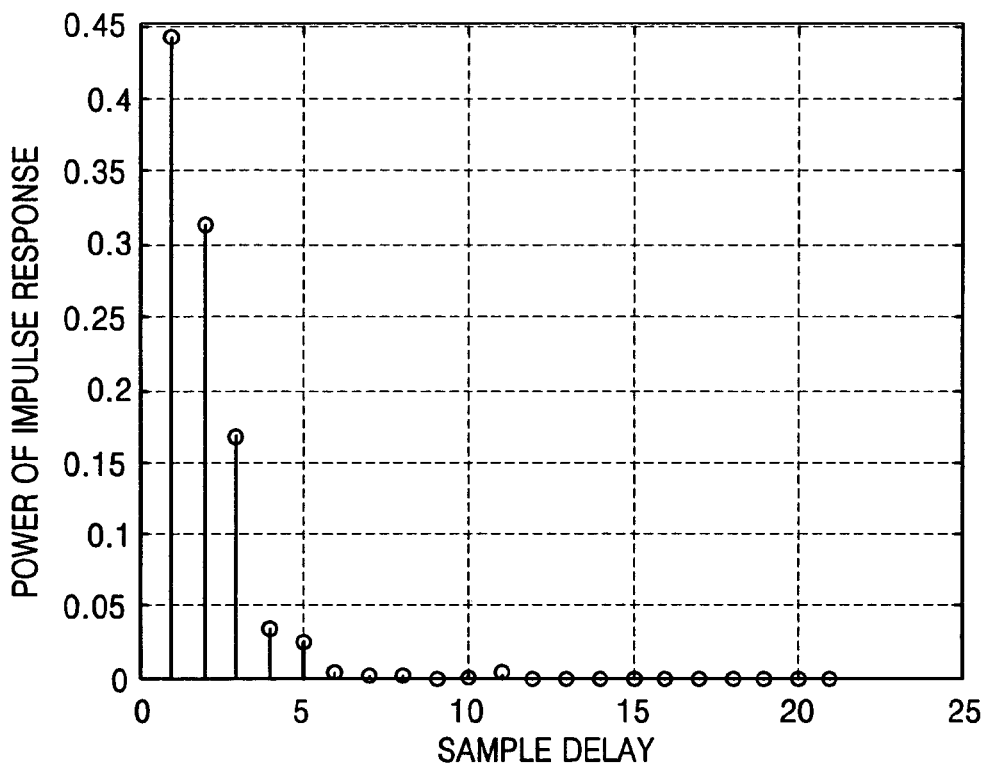
FIG. 11 is a graph illustrating an exponential functional channel model having a 180 nsec RMS delay spread used in simulations.
Figure 12:
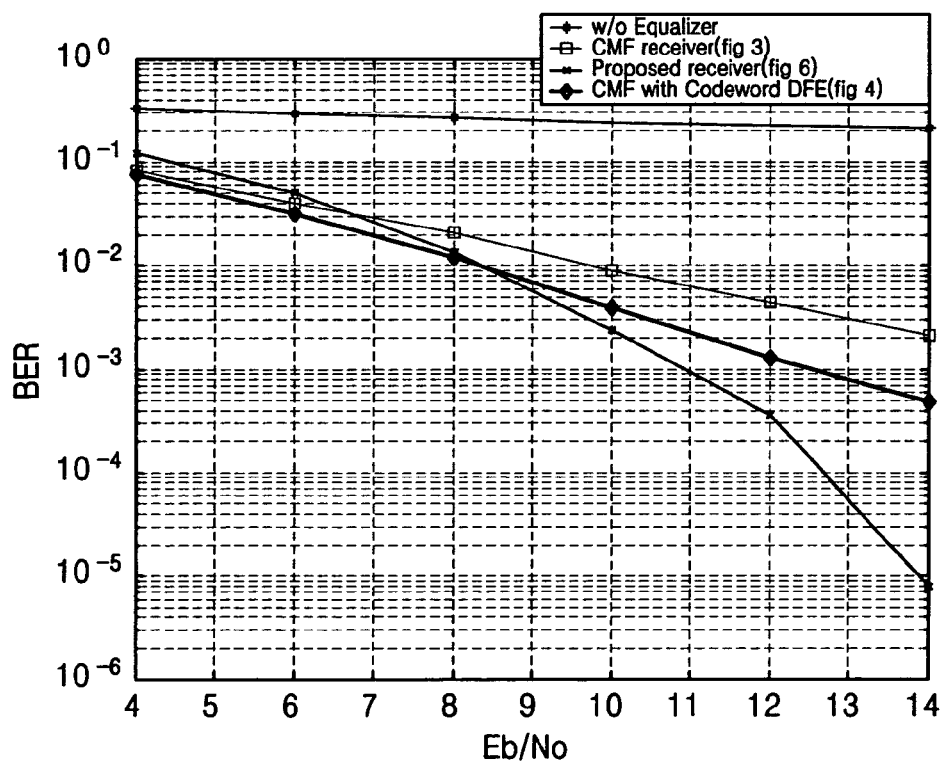
FIG. 12 is a graph illustrating results of performance simulations of the devices of FIGS. 3, 4, and 6 for the exponential functional channel model illustrated by FIG. 11.

FIG. 11 is a graph illustrating an exponential functional channel model having a 180 nsec RMS delay spread used in simulations. FIG. 12 is a graph illustrating results of performance simulations of FIGS. 3, 4, and 6 for the channel model of FIG. 11.

Simulations involved an exponential functional 21-ray channel model including seven taps of each of the channel matched filter 31, seven taps of the feed forward filter 61, and six taps of the feed back filter 63. Referring to FIG. 12, as the Eb/No increased, the rake receiver according to an embodiment of the present invention of FIG. 6 showed a significantly superior BER over the conventional receivers of FIGS. 3 and 4.

As described above, the rake receiver for wireless LANs according to an embodiment of the present invention includes an ICI detector 503 and an ISI detector 504. The ICI detector 503 detects ICI information 509 of a-symbol based on first correlation values extracted from a CCK symbol stream and outputs the ICI information 509. The ISI detector 504 detects the ISI information 510 of a previous symbol using CCK data determined by a CCK code determination unit 33 and outputs the detected ISI information 510. Accordingly, the CCK code determination unit 33 generates CCK data based on a subtracted signal 512 obtained by subtracting interference information 511 including the ICI information 509 and the ISI information, 510 of the previous symbol from a matched filtered signal 507 of the received CCK symbol stream, and outputs CCK data.

As described above, a rake receiver for wireless LANs according to an embodiment of the present invention compensates for energy loss of a CCK signal transmitted in a multi-path wireless channel environment and eliminates ISI and ICI from the received CCK signal because a DFE structure per chip used for calculating ICI components is connected in parallel with a DFE structure per symbol, thus eliminating ISI and ICI components. In addition, since the rake receiver eliminates interference components of each of CCK symbols using the demodulated CCK data from the CCK correlators, the interference components can be more precisely eliminated by taking advantage of error correction capability of the CCK data. Therefore, the rake receiver for IEEE 802.11.B/G standard using a CCK demodulation scheme may effectively be used in outdoor WLAN environments and multi-path channel environments having large delays.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A rake receiver for a wireless local area network comprising:
    an inter-chip interference detector detecting inter-chip interference information of a symbol based on first correlation values extracted from a received symbol stream and outputting the inter-chip interference information;
    a code determination unit extracting a peak of a symbol from second correlation values extracted from the received symbol stream and inter-symbol interference information of a previous symbol and outputting code data corresponding to the peak; and
    an inter-symbol interference detector detecting the inter-symbol interference information of the previous symbol using the code data.

2. The rake receiver of claim 1, wherein the received symbol stream is composed of complementary code keying symbols.

3. The rake receiver of claim 2, wherein each of the complementary code keying symbols is composed of eight chips.

4. The rake receiver of claim 1, wherein the code data is eight bit complementary code keying data.

5. The rake receiver of claim 1, further comprising:
    a channel matched filter receiving the received symbol stream, match filtering the received symbol stream, and outputting a matched filtered signal;
    an equalizer receiving the matched filtered signal, performing distortion compensation, and outputting a distortion compensated signal; and
    a first correlator receiving the distortion compensated signal, calculating and outputting the first correlation values.

6. The rake receiver of claim 5, wherein the equalizer comprises:
    a feed forward filter filtering the matched filtered signal and outputting a first finite impulse response filtered signal;
    a subtracting unit subtracting a second finite impulse response filtered signal from the first finite impulse response filtered signal and outputting the distortion compensated signal;
    a chip determination unit determining a logic state of each bit value of the distortion compensated signal and outputting a digital signal based on the determined logic state value; and
    a feed back filter filtering the digital signal and outputting the second finite impulse response filtered signal.

7. The rake receiver of claim 6, wherein each of the feed forward filter and the feed back filter delays an input signal by a predetermined sampling of time, generates delayed signals, multiplies each of the delayed signals by predetermined coefficients, adds the multiplied signals, and outputs the result.

8. The rake receiver of claim 1, further comprising
    a delay unit delaying a matched filtered signal for a predetermined period of time and outputting a delayed signal;
    a first subtracting unit subtracting interference information from the delayed signal and outputting a subtracted signal;
    a correlator receiving the subtracted signal from the subtracting unit, and calculating and outputting second correlation values; and
    an adding unit adding the inter-chip interference information and the inter-symbol interference information of the previous symbol and outputting the result as the interference information.

9. The rake receiver of claim 8, wherein the predetermined period of time is a period of one symbol.

10. A method of compensating for energy loss and eliminating inter-symbol interference and Inter-chip interference in a rake receiver for a wireless local area network, the method comprising;
    detecting inter-chip interference information of a symbol based on first correlation values extracted from a received symbol stream;
    extracting a peak of a symbol from second correlation values extracted from the received symbol stream and inter-symbol interference information of a previous symbol and generating code data corresponding to the peak; and
    detecting the inter-symbol interference information of the previous symbol using the code.

11. The method of claim 10, wherein the received symbol stream is composed of complementary code keying symbols.

12. The rake receiver of claim 11, wherein each of the complementary code keying symbols is composed of eight chips.

13. The rake receiver of claim 10, wherein the code data is eight bit complementary code keying data.

14. The method of claim 10, further comprising:
match filtering the received symbol stream;
performing distortion compensation on the match-filtered signal; and
calculating the first correlation values from the distortion compensated signal.

15. The method of claim 14, wherein the distortion compensation comprises:
filtering the matched filtered signal, thereby generating a first finite impulse response filtered signal;
subtracting a second finite impulse response filtered signal from the first finite impulse response filtered signal, thereby generating the distortion compensated signal;
determining a logic state of each bit value of the distortion compensated signal and generating a digital signal having the determined logic state values; and
filtering the digital signal, thereby generating a second finite impulse response filtered signal.

16. The method of claim 15, wherein each of the first finite impulse response filtering and the second finite impulse response filtering comprises delaying an input signal by a predetermined sampling of time, generating delayed signals, multiplying each of the delayed signals by predetermined coefficients, and adding the multiplied signals.

17. The method of claim 10, further comprising:
delaying the matched filtered signal for a predetermined period of time;
subtracting interference information from the delayed signal;
calculating second correlation values based on the subtracted signal; and
adding the inter-chip interference information and the inter-symbol interference information of the previous symbol and the result as the interference information.

18. The method of claim 17, wherein the predetermined period of time is a period of one symbol.

* * * * *